(12) United States Patent
Vaidyanathan et al.

(10) Patent No.: US 8,281,397 B2
(45) Date of Patent: Oct. 2, 2012

(54) METHOD AND APPARATUS FOR DETECTING SPOOFED NETWORK TRAFFIC

(75) Inventors: Ravichander Vaidyanathan, Belle Mead, NJ (US); Abhrajit Ghosh, Edison, NJ (US); Yuu-Heng Cheng, Piscataway, NJ (US); Akira Yamada, Tokyo (JP); Yutaka Miyake, Saitama (JP)

(73) Assignee: Telcordia Technologies, Inc., Piscataway, NJ (US)

( * ) Notice: Subject to any disclaimer, the term of this patent is extended or adjusted under 35 U.S.C. 154(b) by 357 days.

(21) Appl. No.: 12/769,696

(22) Filed: Apr. 29, 2010

(65) Prior Publication Data

US 2011/0271340 A1 Nov. 3, 2011

(51) Int. Cl.
H04L 29/06 (2006.01)

(52) U.S. Cl. ............ 726/22; 726/23; 709/223; 709/224; 709/225

(58) Field of Classification Search .................... 726/22; 709/225

See application file for complete search history.

(56) References Cited

U.S. PATENT DOCUMENTS

| | | | | |
|---|---|---|---|---|
| 7,420,929 | B1 * | 9/2008 | Mackie | 370/252 |
| 7,779,107 | B2 * | 8/2010 | Ishiyama et al. | 709/223 |
| 2002/0040394 | A1 * | 4/2002 | Shapira | 709/224 |
| 2003/0120766 | A1 * | 6/2003 | Ishiyama et al. | 709/223 |

OTHER PUBLICATIONS

Consensus Roadmap for Defeating Distributed Denial of Service Attacks, Version 1.10—Feb. 2000. CERT/CC at Carnegie Mellon University (Rich Pethia), The SANS Institute (Alan Paller), and The Center for Education and Research in Information Assurance & Security (CERIAS) at Purdue University (Gene Spafford). Available at: http://www.sans.org/dosstep/roadmap.php.
"Worldwide Infrastructure Security Report", Oct. 2008. Arbor Networks. Available at: http://www.arbornetworks.com/report.
G. Robert Malan, "Observations and Experiences Tracking Denial-Of-Service Attacks Across a Regional ISP", Arbor Networks / University of Michigan. Available at: http://www.arbornetworks.com/index.php?option=com_docman&task=doc_download&gid=97.
Chris Benton, "Egress Filtering FAQ", Apr. 2006, SANS Institute InfoSec Reading Room. Available at: http://www.sans.org/reading_room/whitepapers/firewalls/egress_filtering_faq_1059?show=1059.php&cat=firewalls.
Barry Raveendran Greene and Neil Jarvis, "Unicast Reverse Path Forwarding (uRPF) Enhancements for the ISP-ISP Edge", Feb. 2001. Cisco Systems, Inc. Available at: ftp://ftp-eng.cisco.com/cons/isp/security/URPF-ISP.pdf.
S. Templeton, K. Levitt, "Detecting Spoofed Packets", Proceedings of the Third DARPA Information Survivability Conference and Exposition (DISCES III), Apr. 2003, Washington, D. C.

(Continued)

Primary Examiner — Ponnoreay Pich
(74) Attorney, Agent, or Firm — Philip J. Feig

(57) ABSTRACT

A method and apparatus for detecting spoofed IP network traffic is presented. A mapping table is created to indicate correlations between IP address prefixes and AS numbers, based on routing information collected from a plurality of data sources. At each interface of a target network, IP address prefixes from a training traffic flow are acquired and further converted into AS numbers based on the mapping table. An EAS (Expected Autonomous System) table is populated by the AS numbers collected for each interface. The EAS table is used to determine if an operation traffic flow is allowed to enter the network.

23 Claims, 7 Drawing Sheets

OTHER PUBLICATIONS

T. Peng, C. Leckie, R. Kotagiri, "Protection from Distributed Denial of Service Attack Using History-based IP Filtering", IEEE International Conference on Communications (ICC 2003),May 2003, Anchorage, Alaska, USA.

A Ghosh, L. Wong, G. Di Crescenzo, R. Talpade, "InFilter: Predictive Ingress Filtering to Detect Spoofed IP Traffic", Proceedings of the Second International Workshop on Security in Distributed Computing Systems (SDCS) (ICDCSW'05)-vol. 02, 2005.

* cited by examiner

METHOD AND APPARATUS FOR DETECTING SPOOFED NETWORK TRAFFIC

FIELD OF THE INVENTION

The present application relates generally to detecting spoofed IP (Internet Protocol) traffic when it enters an ISP (Internet Service Provider) network, and particularly to a method and apparatus for detecting packets with spoofed source IP addresses by combining AS (Autonomous System) membership information with historical traffic flows.

BACKGROUND

Spoofed IP traffic (traffic containing packets with incorrect source IP addresses) is often used by Internet-based attackers for anonymity, to reduce the risk of trace-back and to avoid attack detection by network-based sensors. Attackers often spoof or disguise the identity of machines that are used to carry out an attack by falsifying the source address of the network communication. This makes it more difficult to detect and identify the sources of attack traffic and sometimes shifts attention away from the attackers and toward innocent third parties.

It is common for a skillful attacker to use an incorrect source IP address in attack traffic emanating from most widely used operating systems. Since IP routing is destination-based, spoofed IP packets are delivered to the intended target in the same way as non-spoofed IP packets. Spoofed IP packets are particularly prevalent in DDoS (Distributed Denial of Service) attacks, wherein an attacker can compel multiple intermediate compromised hosts to inundate a target host or network with a cumulatively high-volume IP traffic stream. Detection of such DDoS attacks by network-based sensors is difficult since spoofing ensures that traffic volume from individual hosts appears to be low.

In addition to high-volume attacks such as DDoS, relatively stealthy attacks may also employ spoofed IP packets. A notable example is the Slammer worm which sends out a single source IP spoofed UDP (User Datagram Protocol) packet that compromises the destination node. Thus, Spoofed IP traffic detection is a generic means by which to detect several different types of network attacks without using specialized detectors for each attack.

Efforts have been made to solve the above problems.

One of the most common solutions to detect and contain spoofed IP traffic is egress filtering. This method uses filtering rules at outbound interfaces of network border routers. These filtering rules prevent traffic with source IP addresses other than those legally assigned to that network, from leaving the network. Thus, egress filtering attempts to address the detection and containment of spoofed traffic at its source. However, the disadvantage faced by egress filtering is a general unwillingness on the part of ISPs to implement it. The benefits of implementing egress filtering are not perceptible to the ISPs implementing the filtering. Thus, there is very little incentive for the ISPs to do so. Further, the maintenance of egress filters is a time-consuming process and out-of-date and/or incorrect egress filters can lead to legitimate traffic being blocked. Accordingly, even though the mechanisms to implement egress filtering are available on most routers in the Internet, a large number of ISPs currently do not implement it. As a consequence, spoofed traffic can be freely originated within hosts at these ISPs.

Another approach for detecting and containing spoofed IP traffic is Unicast Reverse Path Forwarding (URPF). A URPF enabled edge router drops an incoming IP packet at a given interface if the outbound path back to the packet's source IP address does not use that interface. In other words, URPF relies on symmetric routing between sources and destinations, and drops any packets that violate this symmetry. URPF assumes the existence of routing symmetry for paths between two end points in the Internet. However, due to the dynamic nature of Internet routing protocols and the fact that a router always chooses the best path to a destination based on these protocols, it is quite possible that the best network path from a source to a destination may be quite different from the best reverse path. As a consequence, there can be many cases where URPF based traffic filtering will drop traffic with valid source IP addresses. Thus, URPF only works in certain specific situations and is not a complete solution to the problem of detecting spoofed IP traffic.

A wide variety of detection methods are classified as (active or passive) host based methods and routing based methods. Host based methods require incorporation of additional functionality at the hosts that are the destinations of potentially spoofed traffic. The routing based detection methods focus on distinguishing between addresses that are external and internal to a network. However, the host based methods are not easy to implement simply because of the large number of end points at which those methods would need to be deployed. Thus, it is impractical to implement the host based methods on a large scale to solve the problem in its entirety. On the other hand, the routing based detection methods attempt to distinguish between addresses that are internal and external to the network and are limited in terms of the extent to which they can solve the spoofing detection problem. Detection of external source addresses on outbound packets is essentially the same as egress filtering (described above) and is thus faced with the same limitations. Detection of internal source addresses on incoming packets provides a limited solution to the problem since it cannot detect spoofing if the incoming packet bears an external source IP address.

Furthermore, another scheme to defend against DDoS attacks based on IP source address filtering near the attack target has also been discussed among network administrators and designers. According to this scheme, each edge router keeps a history of all the legitimate IP addresses, which have previously appeared in the network. When the edge router is overloaded, this history is used to decide whether to admit an incoming IP packet. However, this scheme only provides a limited solution to the problem, because it makes use of a history set of source IP addresses observed at only a single edge router. If a source IP address, on an incoming packet, is not in the edge router's history set but is still valid, it could incorrectly be dropped as being spoofed.

Yet another known scheme presents a predictive ingress filtering approach that makes use of the "InFilter" hypothesis to detect spoofed source IP addresses in traffic near its destination. The approach leverages historical source IP address information across multiple edge routers to infer spoofing activity in observed traffic. This scheme somewhat alleviates the problem faced, by using source IP address histories across multiple edge routers. If the source IP address, on an incoming packet, is not in the incoming edge router's history set but is in the history set of some other edge router, the packet will not be allowed to pass through, and instead will be disregarded as it arrived at the wrong edge. However, this method still suffers from a limitation when certain source IP addresses are not seen at any of the edge routers in the ISP's network during the period when historical information is gathered. If the IP addresses are observed at a later time, they would be dropped as being spoofed.

Therefore, there is a need for a reliable and effective method and apparatus to detect network traffic with spoofed source IP addresses.

BRIEF SUMMARY

According to one aspect of the present invention, a method of detecting spoofed Internet Protocol (IP) traffic directed to a network having a plurality of interfaces is provided. The method includes creating a mapping table indicating correlations between IP address prefixes and AS numbers by processing routing information from a plurality of data sources. The method further includes, for each interface, acquiring IP address prefixes from a training traffic flow entering the interface; converting the IP address prefixes into AS numbers based on the mapping table; and generating an interface expected AS number table based on the AS numbers. The method further includes determining if an operational traffic flow is allowed to enter the network based on the interface expected AS number table.

A program storage device, such as computer readable medium, readable by a machine, tangibly embodying a program of instructions executable by the machine to perform methods described herein may also be provided.

According to another aspect of the present invention, an anti-spoofing apparatus is provided. The apparatus includes a mapping component, which generates a mapping table indicating correlations between IP address prefixes and AS numbers by processing routing information from a plurality of data sources. The apparatus further includes a learning component, which acquires IP address prefixes from a plurality of training traffic flows, converts the acquired IP address prefixes into AS numbers based on the mapping table and generates an expected AS number table based on the converted AS numbers. The apparatus further includes a determining component, which acquires an IP prefix of an incoming operational traffic flow, converts the IP prefix into an AS number based on the mapping table and determines whether the incoming operational traffic flow is allowed to enter the network.

According to yet another aspect of the present invention, a network system capable of detecting spoofed incoming IP traffic is provided. The network system includes a plurality of interfaces for receiving and forwarding traffic flows, a plurality of traffic monitors in communication with the plurality of interfaces for collecting information from the traffic flows and at least one server in communication with the plurality of traffic monitors for controlling the traffic flows within the network system. The server includes an anti-spoofing apparatus. The apparatus includes a mapping component, which generates a mapping table indicating correlations between IP address prefixes and AS numbers by processing routing information from a plurality of data sources. The apparatus further includes a learning component, which acquires IP address prefixes from a plurality of training traffic flows, converts the acquired IP address prefixes into AS numbers based on the mapping table and generates an expected AS number table based on the converted AS numbers. The apparatus further includes a determining component, which acquires an IP prefix of an incoming operational traffic flow, converts the IP prefix into an AS number based on the mapping table and determines whether the incoming operational traffic flow is allowed to enter the network.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

Figure 1:
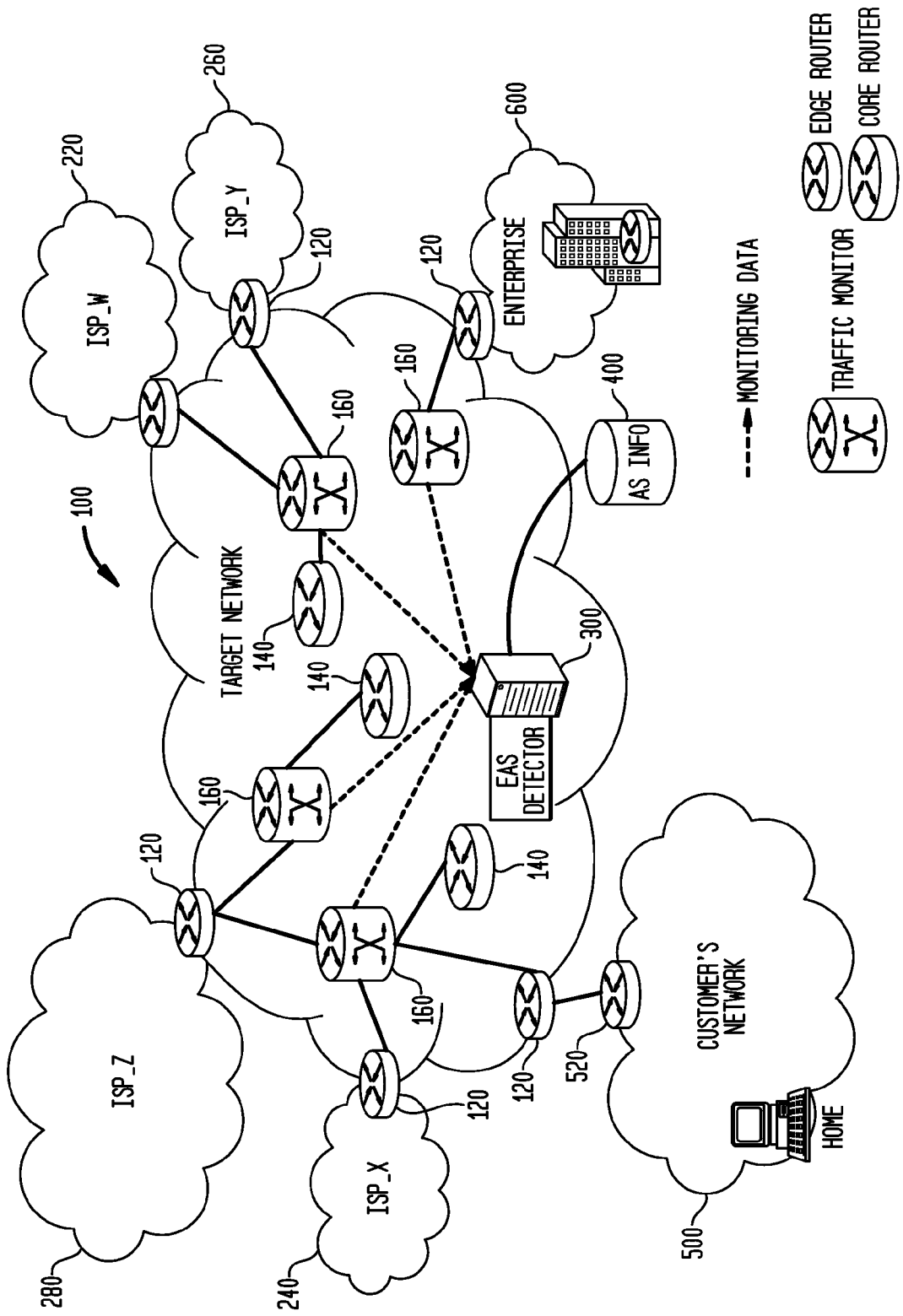
FIG. 1 illustrates an exemplary network, to which a method according to an aspect of the present invention can be applied.

The specification is now described with reference to the drawings, wherein like reference numerals are used to refer to like elements throughout. In the following description, for purposes of explanation, numerous specific details are set forth in order to provide a thorough understanding of the subject specification. It may be evident, however, that the specification can be practiced without these specific details. In other instances, well-known structures and devices are shown in block diagram form in order to facilitate describing the specification.

FIG. 1 illustrates a target network 100 having a plurality of interfaces, through which traffic to and from the network can be implemented. For example, the target network 100 includes a plurality of edge routers 120, each of which receives traffic from a plurality of external networks, such as ISP_W 220, ISP_X 240, ISP_Y 260 and ISP_Z 280, and further forwards the traffic into the target network 100. The target network 100 further includes a plurality of core routers 140, which are internal to the network and route traffic flows within the network. Also internal to the network are a plurality of traffic monitors 160, which collect information about traffic traversing the network. Such information includes, but is not limited to, source and destination IP addresses, source and destination ports, packet sizes, time when incoming packets to the network were observed, and so on.

The traffic monitors 160 are in communication with the edge routers 120, core routers 140 and a server 300. The server 300 controls traffic flows within the network 100 and traffic flows between the network 100 and external networks. For example, the server 300 may instruct the edges routers 120 in the network 100 when each router may transmit data or for how long each router may transmit data. The server 300 may further instruct the edges routers 120 in the network 100 what type of data each router may transmit and where this transmission should be directed.

A database 400, in communication with the server 300, can also be provided. The database 400 can store data pertaining to AS numbers. The target network 100 can further receive traffics from and transmit traffics to a customer's network 500, through one of the edge routers 120 and an edge router 520 of the customer's network. The target network 100 can further receive traffics from and transmit traffics to an enterprise's network 600, through one of the edge routers 120.

According to an aspect of the present invention, packets from the same origin AS typically use the same 'last hop' AS while entering a destination network. Thus, from the perspective of a destination network, this implies that packets originating from the same origin AS will typically arrive at the same Internet border router, or set of border routers in the case of load balancing implementations. Therefore, in terms of the network implementation, IP address prefixes from the same origin AS will be observed at the same network interface or network interconnection point, or set of interfaces in the case of redundant or load balancing network configuration.

The above understanding is used to construct an Expected AS (EAS) number table, a set of AS numbers that is deemed as valid for a particular network interface. The EAS table is constructed by examining historical traffic traces associated with a particular network interface. Source IP addresses in IP packets are correlated with origin AS information by leveraging BGP (Border Gateway Protocol) routing information or routing registries. If a packet with an origin AS a is observed at an interface i, AS a is added to the EAS number table set for interface i.

The EAS based spoofing detection scheme, according to the present invention, is most effective when implemented at interfaces in AS border routers. In addition, the EAS based spoofing detection scheme can also be implemented by observing historical traffic traces at core routers and/or dedicated traffic collection points in the network.

Figure 2:
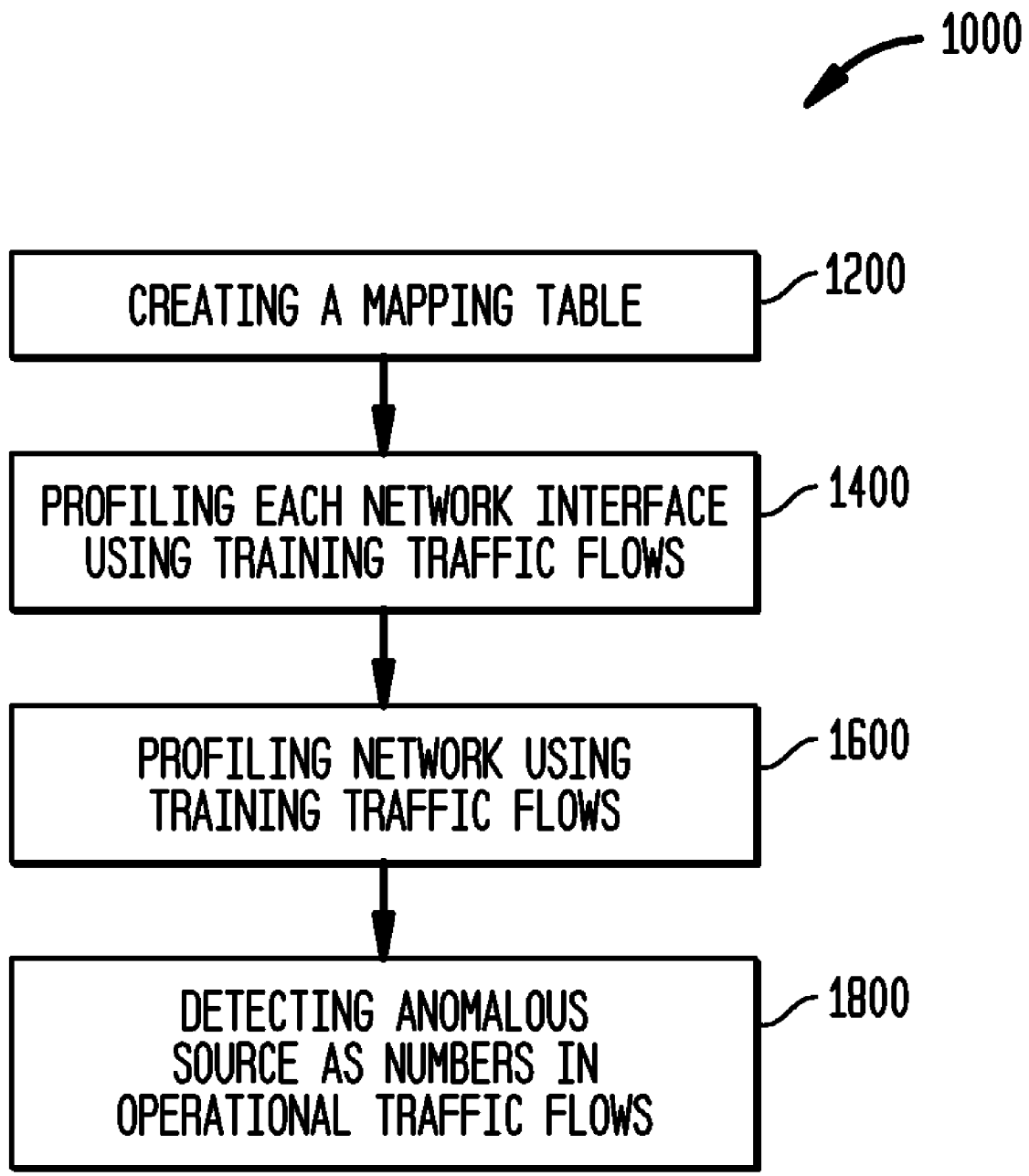
FIG. 2 is an exemplary flow chart illustrating steps of a method of detecting spoofed IP traffic according to an aspect of the present invention.

FIG. 2 is a flow chart illustrating a method 1000 of detecting spoofed IP traffic according to an aspect of the present invention.

At step 1200, a mapping table indicating correlations between IP address prefixes and AS numbers is created. The step 1200 includes processing BGP routing information from a plurality of data sources, to create the mapping table. In one embodiment, BGP routing information pertaining to specific source IP address prefixes can be collected locally from the network operator's routers (local BGP routers), from RouteViews servers and/or from IRR (Internet Routing Registry) databases. For example, the routing information includes AS origin or membership information.

Typically, IRR databases contain authoritative information mapping registered IP address prefixes to their corresponding ASes. However, the mapping of an IP address prefix to an AS may not be one to one. For example, one IP address prefix can be registered with several AS numbers. Furthermore, a registered IP address prefix does not necessarily indicate that the specific prefix is used in the registered network. In addition, every IP address prefix is not necessarily registered with a given set of IRR databases.

Typically, RouteViews servers contain live BGP routing data that represents the actual information used by routers in the Internet to forward traffic. This data can also be used to infer a corresponding AS number for a given IP address prefix. However, RouteViews data from a given set of servers may not contain information about a given IP address prefix since the prefix may not be visible at these servers.

Typically, a network operator's local BGP routers are subject to similar constraints as RouteViews servers and therefore cannot be considered authoritative sources of IP address prefix to AS number mappings.

Figure 3:
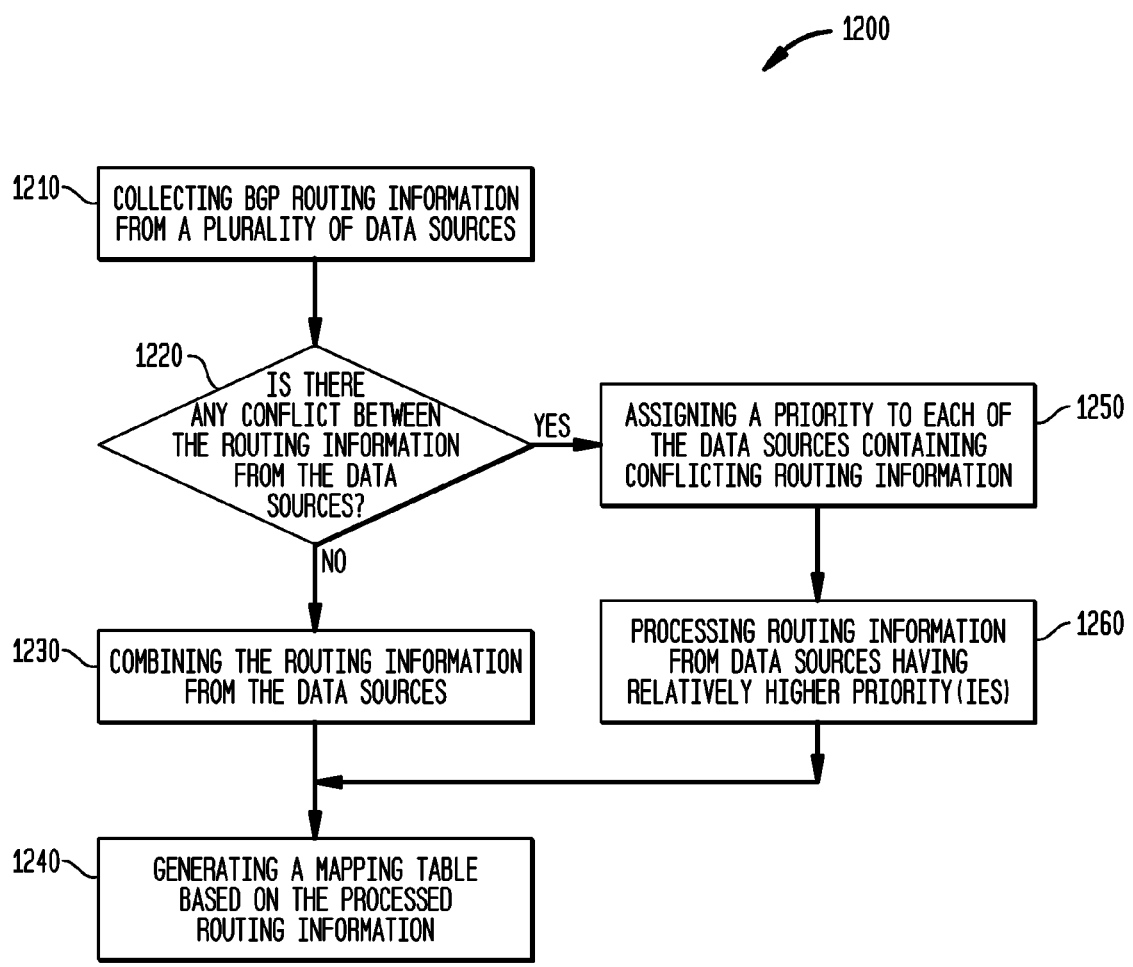
FIG. 3 is an exemplary flow chart illustrating steps of creating a mapping table indicating correlations between IP address prefixes and AS numbers.

Considering the deficiencies in the BGP routing information from the data sources discussed above, the step 1200 of creating the mapping table is implemented according to a flow chart shown in FIG. 3.

As shown, at sub-step 1210, BGP routing information is collected from the local BGP routers, RouteViews servers and IRR databases, respectively. At step 1220, it is determined if any conflict exists between the respective routing data acquired from the local BGP routers, RouteViews servers and IRR databases. If the respective BGP routing data from the difference data sources are not in conflict (1220=NO), at sub-step 1230, the various BGP routing data are combined or merged. Subsequently, at sub-step 1240, the processed information is used to create a mapping table indicating correlations between IP address prefixes and AS numbers.

However, if there is a conflict between the BGP routing data from the different data sources determined at the sub-step 1220 (1220=YES), a priority is assigned to each data source containing conflicting routing data, at sub-step 1250. Subsequently, the routing data from the data source having a relatively higher priority can be further processed at sub-step 1260, for example, combined with routing data from other data sources not containing conflicting routing data. Subsequently, at the sub-step 1240, the processed information is used to create a mapping table indicating correlations between IP address prefixes and AS numbers.

In one exemplary embodiment, if an IRR database and a RouteViews server contain conflicting AS data about the same IP address prefix, a relatively higher priority is assigned to the IRR database and a relatively lower priority is assigned to the RouteViews server. Subsequently, the routing data from the IRR database is combined with the routing data from a network operator's local BGP routers, to create a mapping table indicating correlations between IP address prefixes and AS numbers. In addition, if there are multiple conflicts among the data from the plurality of data resources, the above steps 1220-1260 can be repeated until all the conflicts are resolved.

Referring back to FIG. 2, after a mapping table is created, the method 1000 proceeds to the step 1400, at which each network interface (such as each of the edge routers 120 shown in FIG. 1) is profiled using training traffic flows and the mapping table created in the step 1200.

Figure 4:
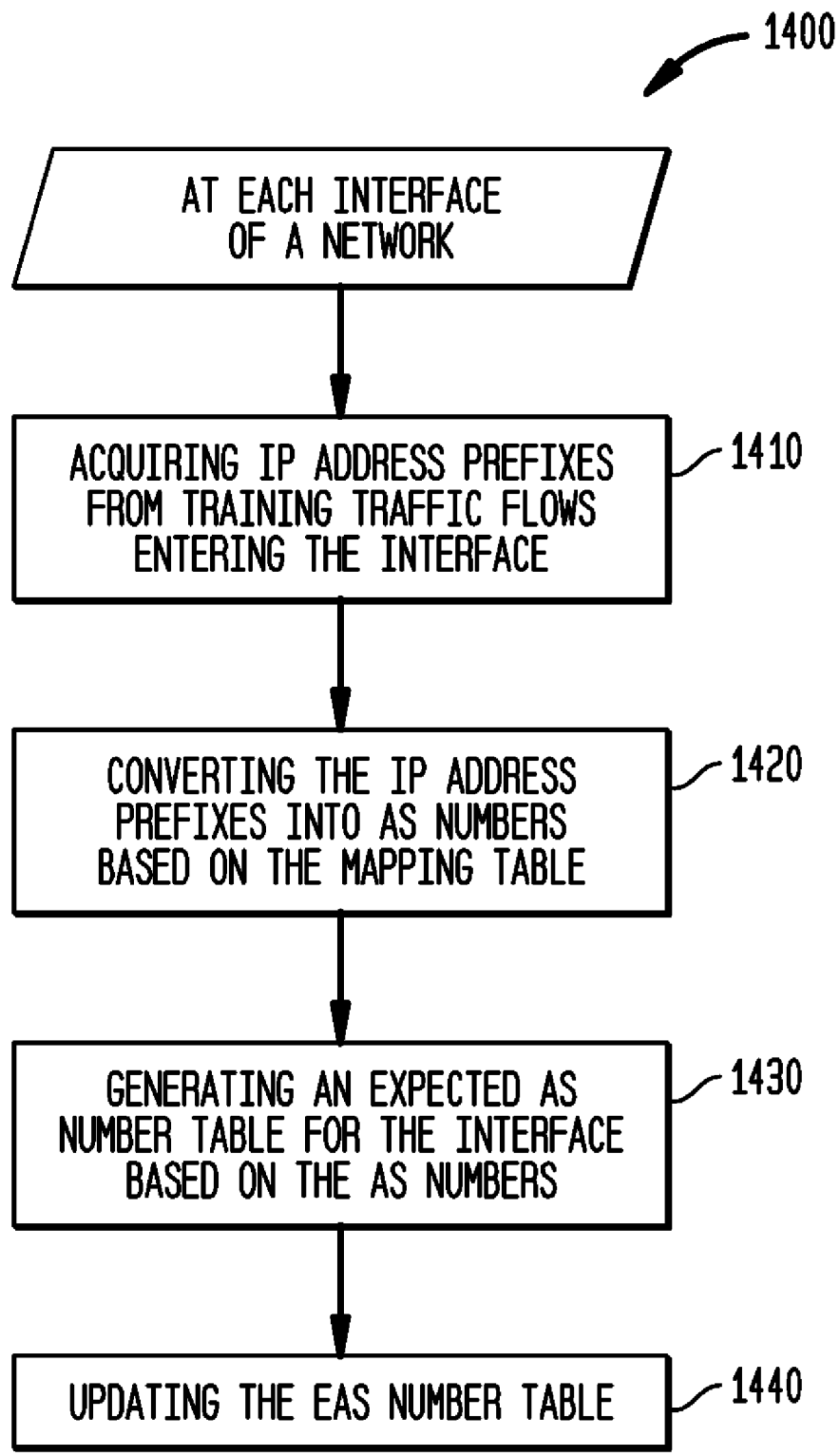
FIG. 4 is an exemplary flow chart illustrating steps of profiling each network interface using training traffic flows.

FIG. 4 is a flow chart illustrating the sub-steps of profiling each interface of a network. The profiling of each interface according to the present invention uses training traffic flows to associate AS numbers with each network interface at dedicated traffic collection points in the network.

At sub-step 1410, for each interface, the source IP address prefixes are extracted from training traffic flows observed at the network interface. For example, a group of incoming packets each containing an IP address prefix are monitored for a first preset period of time. The first preset period of time is adjustable.

At sub-step 1420, the IP address prefixes are converted into AS numbers based on the mapping table created in the step 1200, which indicates correlations between IP address prefixes and AS numbers. At sub-step 1430, an EAS number table for the interface is generated based on the converted AS numbers from the sub-step 1420. The EAS number table maps each network interface at each traffic collection point, to a set of AS numbers observed at the interface.

Additionally, the EAS number table for each network interface can be updated periodically, at sub-step 1440. For example, the EAS number table can be updated based on the changes or updates to the mapping table indicating correlations between IP address prefix and AS numbers. In an exemplary embodiment, the EAS number table is updated by using a new set of training traffic flows, which could happen due to a change in the routing topology either within the target network or in some portions of the Internet connected to the target network.

Furthermore, according to another exemplary embodiment, measures are taken to eliminate any possible IP packets with spoofed source addresses from the training traffic flow. For example, the measures can include filtering out flows that are destined for attack victims, by eliminating all traffic to a destination that sees an abnormally high load. Based on the previously described understanding that packets originating from the same origin AS will typically arrive at the same Internet border router, it is expected that the EAS Set for a given network interface will be fairly stable.

Referring back to FIG. 2, after each network interface has been profiled by generating an EAS number table for each interface at the step 1400, the method 1000 proceeds to step 1600, at which the network is profiled by generating a comprehensive EAS number table based on the respective EAS number table for each interface. For example, the comprehensive EAS number table can include a plurality of entries, each associated with a specific interface and containing the EAS number table for the interface. The comprehensive EAS number table maps the network interfaces to a group of AS numbers observed at each interface of the network.

At step 1800, anomalous source AS numbers in operational traffic flows are detected.

Figure 5:
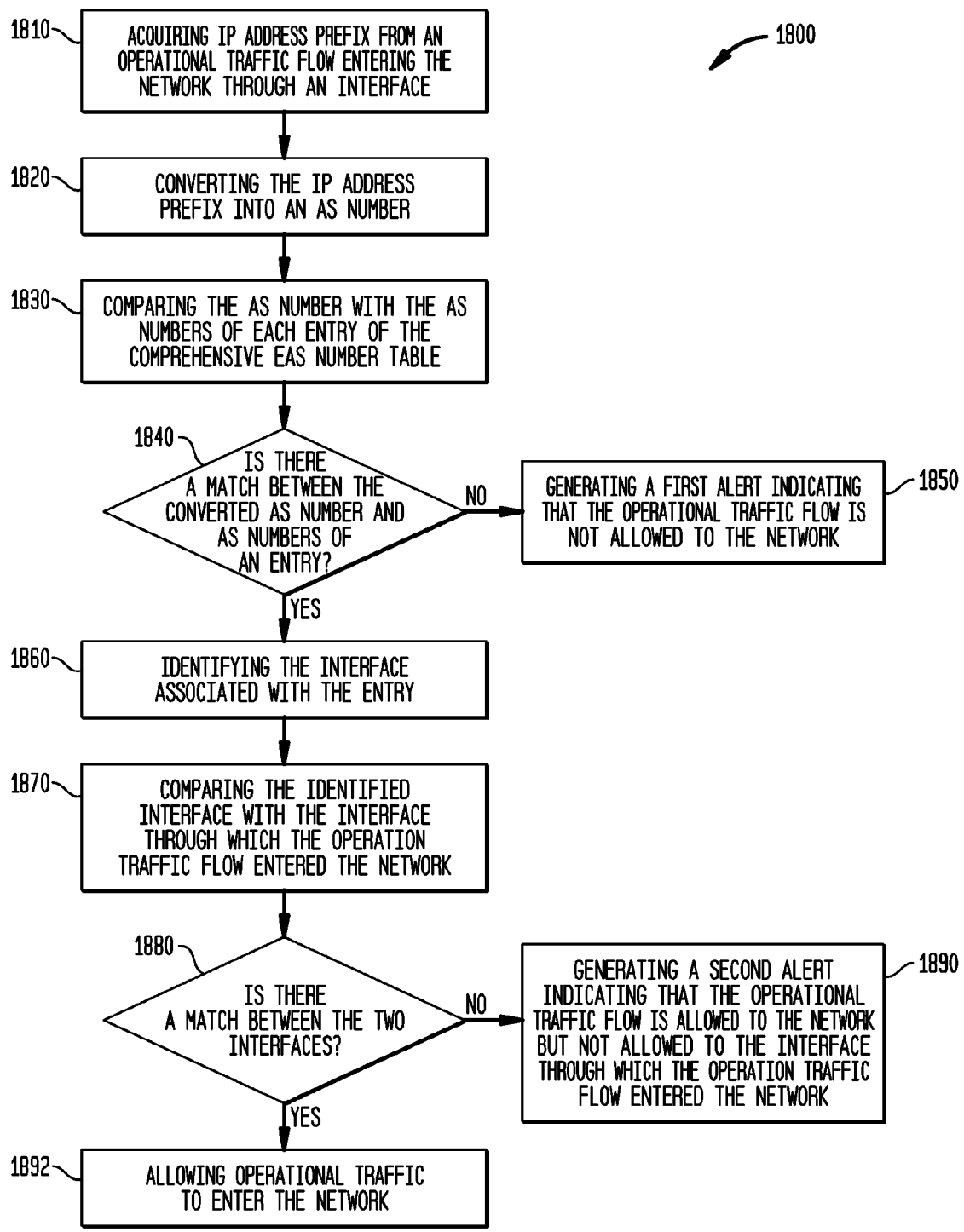
FIG. 5 is an exemplary flow chart illustrating steps of detecting anomalous source AS numbers in operational traffic flows.

FIG. 5 is a flow chart illustrating the sub-steps of detecting anomalous source AS numbers. At sub-step 1810, IP address prefixes from an operational traffic flow are acquired. At this sub-step, for example, at least one incoming packet of the operational traffic flow enters the network through a specific interface, and the packet is monitored during a second preset period of time to extract the IP address prefix of the packet. The second preset period of time is adjustable.

At sub-step 1820, the acquired IP address prefix is converted into at least one AS number based on the mapping table created at the step 1200. At sub-step 1830, the converted AS number is compared with the AS numbers of each entry of the comprehensive EAS number table generated at step the 1600.

At sub-step 1840, it is determined whether there is a match between the converted AS number and AS numbers of an entry of the comprehensive EAS number table. If there is no match (1840=NO), at sub-step 1850, a first alert is generated, indicating that the operational traffic flow is not allowed to the network. If there is a match between the converted AS number and at least one AS number of an entry (1840=YES), at sub-step 1860, the interface associated with the entry is identified.

Subsequently, at sub-step 1870, the identified interface is compared to the interface through which the operation traffic flow entered the network. At sub-step 1880, it is determined if there is a match between the two interfaces. If there is no match (1880=NO), at sub-step 1890, a second alert is generated, indicating that the operational traffic flow is allowed to the network but not allowed to the specific interface. If there is a match (1880=YES), at sub-step 1892, the operational traffic is allowed to enter the network through the specific interface.

The method according to above exemplary embodiments of the present invention correlates historical traffic flows with AS level routing information to identify anomalous source AS number, to detect spoofed IP traffic. Instead of focusing on IP addresses to detect spoofed traffic, the method according to these embodiments of the present invention uses origin AS of the IP packets for spoofed packet detection. The number of active IP prefixes in the Internet routing tables is roughly 330K, while the number of active AS numbers is roughly 32K. Thus, the method according to these embodiments of the present invention results in much more scalable detection mechanisms. In addition, filters that leverage AS numbers rather than IP addresses would be an order of magnitude smaller in size, which further enhances the applicability and practicality of the method.

Furthermore, the method according to the above exemplary embodiments of the present invention maps the IP addresses to AS numbers. Thus, traffic with IP addresses, which have never been observed before, can be classified as legitimate or spoofed, as long as some traffic from the same origin AS has been observed. Accordingly, dramatic reduction in the amount of time required for training the detection algorithm and in the number of false positives identified by the spoof detection algorithm can be achieved.

Figure 6:
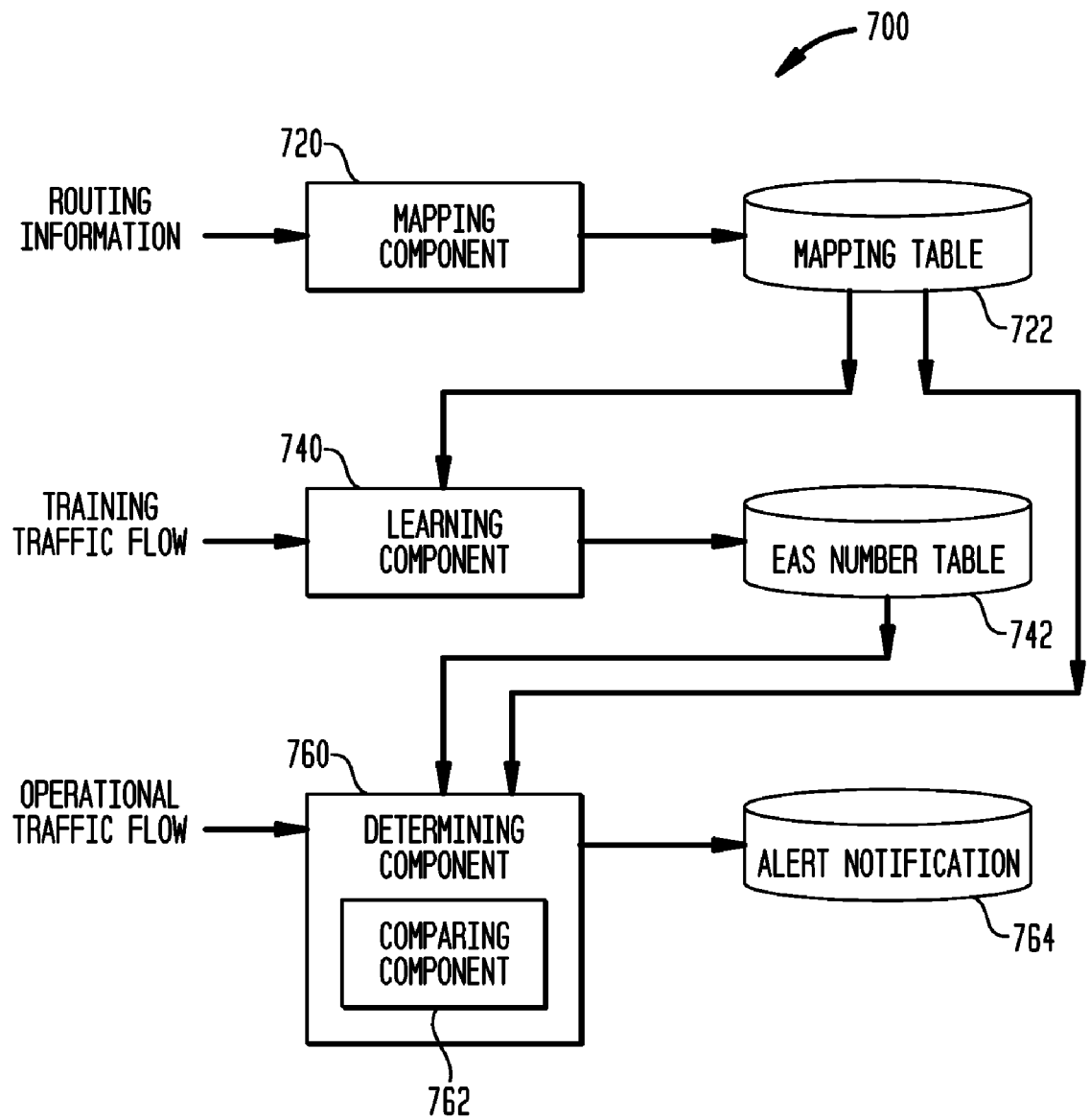
FIG. 6 is a block diagram of an exemplary anti-spoofing apparatus according to another aspect of the present invention.

FIG. 6 is a block diagram illustrating an exemplary anti-spoofing apparatus 700 according to another aspect of the present invention. The apparatus 700 can be employed to detect spoofed IP traffic directed to a network having a plurality of interfaces. The apparatus can avoid attack traffics from entering the network by dynamically learning correlations between a set of legitimate AS numbers and their corresponding IP addresses, and further verifying whether the IP address of an incoming traffic flow corresponds to a legitimate AS number. A spoofed traffic flow is determined by comparing the AS number of the traffic flow with an EAS number table.

Typically, the anti-spoofing apparatus 700 includes a mapping component 720, a learning component 740 and a determining component 760.

The mapping component 720 receives and processes routing information originated from a plurality of data sources, to generate a mapping table indicating correlations between IP address prefixes and AS numbers. The mapping table can be stored in a database 722.

The learning component 740 acquires IP address prefixes from a plurality of training traffic flows entering the network. By referencing the mapping table generated by the mapping component 720, the learning component converts the acquired IP address prefixes into AS numbers, which are used to generate an EAS number table. The EAS number table can be stored in a database 742.

The determining component 760 acquires the IP prefix of an incoming operational traffic flow, and converts the IP prefix into an AS number based on the mapping table generated by the mapping component 720. The determining component 760 further determines whether the incoming operation traffic flow is allowed to enter the network. For example, the determining component 760 can include a comparing component 762, which compares the converted AS number with the AS numbers of the EAS number table generated by the learning component 740. If there is no match between the converted AS number and the AS numbers of the EAS number table, the determining component 760 can generate an alert notification, which can be stored in a database 764.

Figure 7:
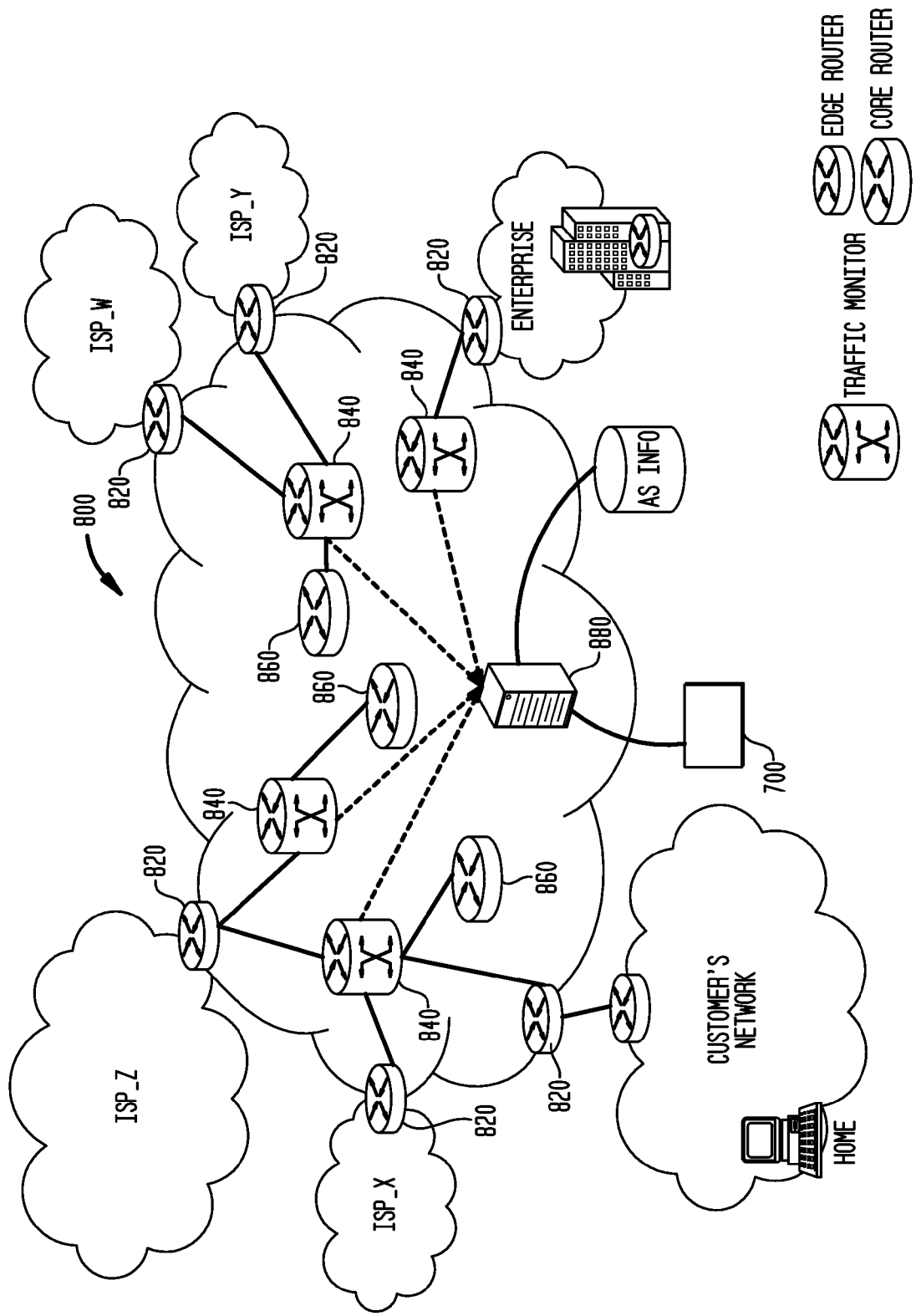
FIG. 7 is a block diagram of an exemplary network system according to yet another aspect of the present invention.

FIG. 7 is a block diagram of a network system 800 according to yet another aspect of the present invention. The network system 800 includes a plurality of edge routers 820, a plurality of traffic monitors 840 and a plurality of core routers 860, all of which are same or similar to those of the network 100 shown in FIG. 1. The network system 800 further includes a server 880, which incorporates the anti-spoofing apparatus 700 shown in FIG. 7. By incorporating the anti-spoofing apparatus 700, the network system 800 is capable of detecting spoofed IP traffic directed to the system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of detecting spoofed Internet Protocol (IP) traffic directed to a network having a plurality of interfaces, comprising:
   creating a mapping table indicating correlations between IP address prefixes and AS numbers by processing routing information from a plurality of data sources;
   for each interface,
      acquiring IP address prefixes from a training traffic flow entering the interface;
      converting the IP address prefixes into AS numbers based on the mapping table; and
      generating an interface expected AS number table for the interface based on the AS numbers; and
   determining if an operational traffic flow is allowed to enter the network based on the interface expected AS number table.

2. The method according to claim 1, wherein the step of acquiring IP address prefixes comprises monitoring a group of incoming packets entering into the interface for a first preset period of time, each of the group of incoming packets containing an IP address prefix.

3. The method according to claim 1, further comprising: generating a comprehensive expected AS number table based on the interface expected AS number table generated for each interface; and determining if an operational traffic flow is allowed to enter the network based on the comprehensive expected AS number table.

4. The method according to claim 3, wherein the step of generating a comprehensive expected AS number table comprises:
   generating an entry associated with each interface, based on the expected AS number table generated for the interface; and
   combining the entries into a comprehensive expected AS number table.

5. The method according to claim 4, wherein the step of determining if an operational traffic flow is allowed to enter the network comprises:
   receiving at least one incoming packet through at least one of the plurality of network interfaces during a second period of time, the at least one incoming packet containing an IP address prefix;
   acquiring the IP address prefix;
   converting the IP address prefix into at least one AS number based on the mapping table;
   comparing the converted AS number with AS numbers of each entry of the comprehensive expected AS number table; and
   determining if there is a match between the converted AS number and the AS numbers of each entry of the comprehensive expected AS number table.

6. The method according to claim 5, further comprising:
   if there is no match between the converted AS number and the AS numbers of each entry of the comprehensive expected AS number table, generating a first alert indicating that the operational traffic flow is not allow to enter the network; and
   if there is a match between the converted AS number and the AS numbers of an entry of the comprehensive expected AS number table,
      identifying an interface associated with the entry;
      comparing the interface associated with the entry with the at least one of the interfaces through which the at least one incoming packet enters the network; and
      determining if there is a match between the interface associated with the entry and the at least one of the interfaces through which the at least one incoming packet enters the network.

7. The method according to claim 6, further comprising: if there is no match between the interface associated with the entry and said at least one of the interfaces through which said at least one incoming packet enters the network, generating a second alert indicating that the operational traffic flow is allowed to enter the network but not allowed to enter said at least one of the interfaces.

8. The method according to claim 1, wherein the step of processing routing information from a plurality of data sources comprises determining if there is a conflict between the routing information from the data sources.

9. The method according to claim 8, further comprising:
   if there is no conflict between the routing information from the data sources, combining routing information from the data sources; and
   if there is a conflict between the routing information from the data sources, assigning a priority for each of the data sources containing conflicting routing information and processing the routing information from the data source(s) having a relatively higher priority.

10. The method according to claim 1, further comprising:
   updating periodically the mapping table by processing routing information from the plurality of data sources; and
   updating periodically the expected AS number table for each interface based on the mapping table.

11. A non-transitory computer readable medium having computer readable program for operating on a computer for detecting spoofed Internet Protocol (IP) traffic directed to a network having a plurality of interfaces, said program comprising instructions that cause the computer to perform the steps:

creating a mapping table indicating correlations between IP address prefixes and AS numbers by processing routing information from a plurality of data sources;

for each interface,
acquiring IP address prefixes from a training traffic flow entering the interface;
converting the IP address prefixes into AS numbers based on the mapping table; and
generating an interface expected AS number table for the interface based on the AS numbers; and determining if an operational traffic flow is allowed to enter the network based on the interface expected AS number table.

12. The non-transitory computer readable medium according to claim 11, wherein the step of acquiring IP address prefixes comprises monitoring a group of incoming packets entering into the interface for a first preset period of time, each of the group of incoming packets containing an IP address prefix.

13. The non-transitory computer readable medium according to claim 11, further comprising: generating a comprehensive expected AS number table based on the interface expected AS number table generated for each interface; and determining if an operational traffic flow is allowed to enter the network based on the comprehensive expected AS number table.

14. The non-transitory computer readable medium according to claim 13, wherein the step of generating a comprehensive expected AS number table comprises:

generating an entry associated with each interface, based on the expected AS number table generated for the interface; and combining the entries into a comprehensive expected AS number table.

15. The non-transitory computer readable medium according to claim 14, wherein the step of determining if an operational traffic flow is allowed to enter the network comprises:

receiving at least one incoming packet through at least one of the plurality of network interfaces during a second period of time, the at least one incoming packet containing an IP address prefix;

acquiring the IP address prefix;

converting the IP address prefix into at least one AS number based on the mapping table;

comparing the converted AS number with AS numbers of each entry of the comprehensive expected AS number table; and determining if there is a match between the converted AS number and the AS numbers of each entry of the comprehensive expected AS number table.

16. The non-transitory computer readable medium according to claim 15, further comprising:

if there is no match between the converted AS number and the AS numbers of each entry of the comprehensive expected AS number table, generating a first alert indicating that the operational traffic flow is not allow to enter the network; and if there is a match between the converted AS number and the AS numbers of an entry of the comprehensive expected AS number table,
identifying an interface associated with the entry;
comparing the interface associated with the entry with the at least one of the interfaces through which the at least one incoming packet enters the network; and
determining if there is a match between the interface associated with the entry and the at least one of the interfaces through which the at least one incoming packet enters the network.

17. The non-transitory computer readable medium according to claim 16, further comprising: if there is no match between the interface associated with the entry and said at least one of the interfaces through which said at least one incoming packet enters the network, generating a second alert indicating that the operational traffic flow is allowed to enter the network but not allowed to enter said at least one of the interfaces.

18. The non-transitory computer readable medium according to claim 11, wherein the step of processing routing information from a plurality of data sources comprises determining if there is a conflict between the routing information from the data sources.

19. The non-transitory computer readable medium according to claim 18, further comprising:

if there is no conflict between the routing information from the data sources, combining routing information from the data sources; and if there is a conflict between the routing information from the data sources, assigning a priority for each of the data sources containing conflicting routing information and processing the routing information from the data source(s) having a relatively higher priority.

20. The non-transitory computer readable medium according to claim 11, further comprising:

updating periodically the mapping table by processing routing information from the plurality of data sources; and updating periodically the expected AS number table for each interface based on the mapping table.

21. An anti-spoofing apparatus comprising:

a mapping component which generates a mapping table indicating correlations between IP address prefixes and AS numbers by processing routing information from a plurality of data sources;

wherein the mapping table is stored in a first database;

a learning component which acquires IP address prefixes from a plurality of training traffic flows entering a network, converts the acquired IP address prefixes into AS numbers based on the mapping table and generates an expected AS number table based on the converted AS numbers;

wherein the expected AS number table is stored in a second database; and a determining component which acquires an IP prefix of an incoming operational traffic flow, converts the IP prefix into an AS number based on the mapping table and determines whether the incoming operational traffic flow is allowed to enter the network;

wherein the determining component comprises a comparing component which compares the converted AS number with the AS numbers of the EAS number table and the determining component generates an alert notification based on the result of the comparison, wherein the alert notification is stored in a third database.

22. A network system comprising:
- a plurality of interfaces for receiving and forwarding traffic flows;
- a plurality of traffic monitors in communication with the plurality of interfaces, for collecting information from the traffic flows; and
- at least one server in communication with the plurality of traffic monitors, for controlling the traffic flows within the network system, said server comprises an anti-spoofing apparatus comprising:
  - a mapping component which generates a mapping table indicating correlations between IP address prefixes and AS numbers by processing routing information from a plurality of data sources;
  - a learning component which acquires IP address prefixes from a plurality of training traffic flows, converts the acquired IP address prefixes into AS numbers based on the mapping table and generates an expected AS number table based on the converted AS numbers; and
  - a determining component which acquires an IP prefix of an incoming operational traffic flow, converts the IP prefix into an AS number based on the mapping table and determines whether the incoming operational traffic flow is allowed to enter the network.

23. The network system according to claim 22, wherein the determining component comprises a comparing component which compares the converted AS number with the AS numbers of the EAS number table, and the determining component generates an alert notification based on the result of the comparison.

* * * * *

UNITED STATES PATENT AND TRADEMARK OFFICE
CERTIFICATE OF CORRECTION

| | | |
|---|---|---|
| PATENT NO. | : 8,281,397 B2 | Page 1 of 1 |
| APPLICATION NO. | : 12/769696 | |
| DATED | : October 2, 2012 | |
| INVENTOR(S) | : Vaidyanathan et al. | |

It is certified that error appears in the above-identified patent and that said Letters Patent is hereby corrected as shown below:

In the Assignee Section, Front page of the Patent:

After "Telcordia Technologies, Inc., Piscataway, NJ (US)," please insert:

-- ; KDDI Corporation (JP) --

Signed and Sealed this

Twenty-ninth Day of January, 2013

David J. Kappos
*Director of the United States Patent and Trademark Office*